(12) United States Patent
Kwan

(10) Patent No.: US 12,264,772 B2
(45) Date of Patent: Apr. 1, 2025

(54) MANEUVERABLE PIPELINE INSPECTION DEVICE

(71) Applicant: Pure Technologies U.S. Inc., Columbia, MD (US)

(72) Inventor: Jeffrey Chak-Fai Kwan, Calgary (CA)

(73) Assignee: Pure Technologies U.S. Inc., Columbia, MD (US)

( * ) Notice: Subject to any disclaimer, the term of this patent is extended or adjusted under 35 U.S.C. 154(b) by 724 days.

(21) Appl. No.: 17/513,081

(22) Filed: Oct. 28, 2021

(65) Prior Publication Data

US 2022/0136637 A1  May 5, 2022

Related U.S. Application Data

(60) Provisional application No. 63/107,882, filed on Oct. 30, 2020.

(51) Int. Cl.
| | | |
|---|---|---|
| *F16L 55/44* | (2006.01) | |
| *B08B 9/049* | (2006.01) | |
| *B08B 9/053* | (2006.01) | |
| *F16L 55/26* | (2006.01) | |
| *F16L 55/32* | (2006.01) | |
| *F16L 101/30* | (2006.01) | |

(52) U.S. Cl.
CPC .............. *F16L 55/44* (2013.01); *B08B 9/049* (2013.01); *B08B 9/053* (2013.01); *F16L 55/265* (2013.01); *F16L 55/32* (2013.01); *F16L 2101/30* (2013.01)

(58) Field of Classification Search
CPC ....... B08B 9/049; B08B 9/053; B08B 9/0551; F16L 55/265; F16L 55/28; F16L 55/30; F16L 55/32; F16L 55/36; F16L 55/40; F16L 55/44; F16L 55/48; F16L 2101/00; F16L 2101/12; F16L 2101/30
See application file for complete search history.

(56) References Cited

U.S. PATENT DOCUMENTS

| | | | |
|---|---|---|---|
| 9,239,297 B2 | 1/2016 | Sibai | |
| 2011/0103189 A1* | 5/2011 | Paulson | G01S 11/14 |
| | | | 367/93 |
| 2016/0001337 A1 | 1/2016 | Ervin | |
| 2016/0272291 A1* | 9/2016 | Outa | G05D 1/10 |
| 2018/0079086 A1* | 3/2018 | Patel | B63C 11/42 |
| 2020/0049302 A1 | 2/2020 | Paulson et al. | |

FOREIGN PATENT DOCUMENTS

| | | | |
|---|---|---|---|
| CN | 110860533 A | * | 3/2020 |
| CN | 109058650 B | | 10/2020 |
| KR | 101295800 B1 | | 8/2013 |
| WO | 2014062077 A1 | | 4/2014 |

OTHER PUBLICATIONS

CN 110860533 A; Yin et al.; Mar. 6, 2020.*

* cited by examiner

*Primary Examiner* — Randall E Chin
(74) *Attorney, Agent, or Firm* — Stanek Lemon Crouse Meeks, PA

(57) ABSTRACT

A device for assessing the condition of a pipeline containing a liquid is provided. The device includes an actuatable maneuvering module to generate a force sufficient to move the device from one side to another side along a horizontal plane and to move the device from top to bottom along a vertical plane, or any combinations thereof, so as to maneuver the device.

11 Claims, 13 Drawing Sheets

MANEUVERABLE PIPELINE INSPECTION DEVICE

CROSS-REFERENCE TO RELATED APPLICATIONS

This application claims priority to U.S. provisional application Ser. No. 63/107,882 filed Oct. 30, 2020, the contents of which are incorporated by reference in their entirety.

TECHNICAL FIELD

The present invention relates to a maneuverable liquid pipeline inspection device and methods of using same.

BACKGROUND

Pipeline inspection devices are deployed into a pipeline to inspect the condition of the walls of the pipeline for moving a fluid, such as oil, water, or wastewater. Pipeline inspection devices include on-board equipment for collecting information about the condition of the pipeline. These devices store the collected information until the device is extracted from the pipeline and the collected information is downloaded and analyzed to assess the condition of the pipeline.

It is known to use remote operated vehicles that roll along the bottom of the pipeline to inspect the condition of the pipeline. Ground-based vehicles, however, are generally not deployed in a pipeline filled with liquid and the pipeline is in service.

Certain pipeline inspection devices are known to be deployable into a liquid-filled pipeline and these devices are usually supported by the liquid and move throughout the pipeline by virtue of the current of the moving liquid. There are advantages of such devices over traditional inspection devices in the ability to insert and extract the inspection device into and out of the pipeline without interrupting the operation of the pipeline. When deployed into the liquid-filled pipeline, the drag of the device in the liquid carries the device downstream and away from the deployment position. Downstream movement can also be facilitated, for example, by attaching a drogue at a position forward of the device. In some cases, such devices are untethered to the surface and follows the flow of the liquid in the pipeline and is able to navigate pipe features such as valves, bends, tees and wyes.

In some cases, these devices are tethered to the surface where the tethering the device allows the operator to deploy and retrieve the device, provide electrical power to operate any sensory equipment on the device, receive and transmit sensory information/data, or any number of other functions.

In the case of the tethered devices, the operator can move the device downstream by providing slack on the tether and upstream (i.e. in reverse) by reeling in the device using the tether. However, no other active maneuvering capability is provided. Furthermore, in some working environments where the velocity of liquid in the pipeline is relatively high, the recovery operation can be complicated and additional effort may be expended to successfully retrieve the deployed device.

Some other pipeline inspection devices include one or more petals which moveably extend radially from the device to protect the device. In such devices, the petals are configured to moveably extend away from the body of the device in order to contact the wall of the pipeline and space the body of device away from wall of the pipeline. In the extended configuration, the petals can contact the wall of the pipeline to assist in keeping the device at about the center of the fluid-filled interior of the pipeline. The petals are moveable between an expanded and collapsed position in relation to the body and are biased towards the expanded position by the use of springs. Petals are typically made from durable material able to withstand repeated contact with the pipeline wall and can be configured to support one or more inspection equipment which benefit from being arranged in closer proximity to the wall of the pipeline.

However, in certain working environments, the use of inspection devices with the radially extending petals can be undesirable. First, the petals take up space and may be a barrier to access of some types of pipelines. For instance, the petals may prevent the device from navigating through certain valves (i.e. butterfly valves (BFVs) such as humpback or flat plate BFVs) in the pipeline. In respect of BFVs, difficulties can be encountered when a humpback BFV is not small enough to partially close the valve to tilt the valve door to reduce the chance of contact with the slats as the device passes through the valve. In such cases, the device can strike the valve and become stuck in the slats of the valve door of the humpback BFV. As well, if there are unknown humpback BFVs or if they cannot be operated, then the risk of getting a stuck device increases. Issues can also arise with flat plate BFVs where the front of the device can get caught on the leading edge of the valve door against a seal and wedge itself against the corner plate. In cases when there is a faster flow velocity, any impacts against the valve can also cause the device to jackknife and wrap around the valve plate.

Second, in some cases, the complexity and added bulk of the supporting petals complicates assembly-disassembly and transportation to and from the job site. Third, in some situations, additional facilities and effort are required in order to configure the device with achieve neutral buoyancy. Fourth, the supporting petals require sufficiently high levels of liquid in the pipeline to be able to function optimally.

In addition, it is known that flexible pipeline inspection devices which are passively moved by the flow of the fluid in the fluid-filled pipeline can encounter pipeline features that make navigation challenging. One such feature is an unfavorable pipeline tee junction that is encountered when the device which is flowing along a main section of pipeline which splits the flow where one part of the flow continues in the same general direction but another part of the flow moves into a lateral off of the main section via a turn (such as an acute turn). Due to one or more of the low drag forces acting on the device to steer the front module into the lateral, the high inertia coming into the tee, the resistance for the device to flex the tow links and supporting petals and the tight turning radius required to execute the turn, it may be difficult to make the turn into the lateral and the device would continue across the tee, coming to a rest or jackknifing or in some cases, reversing the rear portion first into the lateral. This can result in a pipeline shutdown and the device would have to be retrieved by person or ROV (remote operated vehicle) from the nearest pipe access manway and add to unnecessary expense and delay. Another unfavorable pipeline tee junction that is encountered is when most or all the flow moves into the lateral and little or no flow continues in the same general direction. This unfavorable pipeline tee junction also makes it difficult to turn the device into the lateral because of the device's inertia.

SUMMARY OF THE INVENTION

It is an embodiment of the present invention to provide a liquid pipeline inspection device and methods of using same to inspect the condition of the pipeline.

According to one aspect, the liquid pipeline inspection device is for collecting information about the condition of the pipeline, the device is configured to be deployable into the pipeline containing a liquid, the device comprising a module configured to maneuver the device within the liquid-filled pipeline.

In one aspect, the device is operable to move in a direction of a vertically extending x-axis, a direction of a horizontally extending y-axis, a direction of an axially extending z-axis, and in any combinations thereof, within a liquid-filled pipeline.

According to one aspect, the device comprises a maneuvering means comprising a radial propulsion system configured to operably move the device from one side to another side along a horizontal plane and to operably move the device from top to bottom along a vertical plane.

According to one aspect, the radial propulsion means is operatively connected to one or more position sensors, the position sensors collect information about the position of the device and send the collected information to control electronics which process the information and then actuate the radial propulsion system to move the device into a desired position based on the collected sensor information.

According to one aspect, there is disclosed a maneuverable liquid pipeline inspection device for assessing the condition of a pipeline, the device comprising a maneuvering means configured to move the device in a desired direction by generating a first thrusting force in a direction of a vertically extending x-axis, a second thrusting force in a direction of a horizontally extending y-axis, or any combination of forces thereof.

According to an embodiment there is provided a pipeline inspection device for assessing the condition of a pipeline containing a liquid, the device comprising an actuatable maneuvering means configured to generate a force sufficient to move the device from one side to another side along a horizontal plane and to move the device from top to bottom along a vertical plane, or any combinations thereof, so as to maneuver the device around a pipeline feature in the intended path of the device as the device is displaced along a length of the pipeline by movement of the liquid in the pipeline.

In one aspect, the maneuvering means comprises a radial propulsion system configured to generate a first thrusting force in a direction of a vertically extending x-axis and a second thrusting force in a direction of a horizontally extending y-axis.

In one aspect, the radial propulsion system comprises a first thruster to generate the first thrusting force and a second thruster to generate the second thrusting force.

In one aspect, the radial propulsion system further comprises a propulsion housing, and the first and second thrusters are secured within the propulsion housing and wherein the first thruster and the second thruster are aligned along a common longitudinal axis.

In one aspect, the first and second thrusters are recessed within the propulsion housing and away from the outer periphery of the housing.

In one aspect, the first and second thrusters are propeller-driven thrusters and the propeller of the first thruster is configured to rotate about the vertically extending x-axis and where propeller of the second thruster is configured to rotate about the horizontally extending y-axis.

In one aspect, the maneuvering means is secured at a forward end, the rear end, or both the forward and rear end of the device.

In one aspect, the maneuvering means is secured at the forward end.

In one aspect, the maneuvering means is removeably securable to the device.

In one aspect, the device further comprising an electronic signal receiver in electronic communication with the maneuvering means, the electronic signal receiver configured to receive an electronic signal from an external transmitter to operably cause the actuation of the maneuvering means to move the device around the pipeline feature.

In one aspect, the device further comprising control electronics comprising a programmable processor configured to actuate the maneuvering means.

In one aspect, the device further comprising a sensor configured to obtain sensory information about the pipeline feature.

In one aspect, the sensor is disposed at the forward end of the device.

In one aspect, the sensor is a camera, a sonar sensor, or a time of flight sensor.

In one aspect, the sensor is in electronic communication with the control electronics, the control electronics configured to receive the sensory information and then operably actuate the maneuvering means to maneuver the device around the pipeline feature.

In one aspect, the control electronics are configured to determine whether the pipeline feature is in the path of the device, wherein when the pipeline feature is determined to be in the path of the device, the control electronics are configured to actuate the maneuvering means to maneuver the device around the pipeline feature.

In one aspect, the device is operatively connected to surface equipment to allow an operator to actuate the maneuvering means and direct movement of the device.

In one aspect, the device comprising a weighted keel to fix the orientation of device before actuation of the maneuvering means.

In one aspect, the device further comprises circumferentially disposed supporting petals configured to resiliently distance the device from the wall of the pipeline and to maintain the device in the longitudinal center of the pipeline during the assessment of the condition of the pipeline.

In one aspect, the pipeline feature is a valve or an unfavorable tee.

In one aspect, the valve is a butterfly valve (BFV) and the unfavorable tee is a lateral pipe off of the pipeline.

According to an embodiment there is provided a system for maneuvering a pipeline inspection device carried by a liquid in a pipeline around a pipeline feature in the intended path of the device during the assessment of the condition of the pipeline, the system comprising:

a transmitter disposed near a pipeline feature configured to transmit an electronic signal; and a pipeline inspection device, the device comprising:

a maneuvering means configured to generate a force sufficient to move the device from one side to another side along a horizontal plane and to move the device from top to bottom along a vertical plane, or any combinations thereof; and an electronic signal receiver in electronic communication with the maneuvering means and configured to receive the electronic signal transmitted by the transmitter to actuate the maneuvering means to operably maneuver the device around the pipeline feature.

According to an embodiment there is provided a system for maneuvering a pipeline inspection device carried by a liquid in a pipeline around a pipeline feature in the intended path of the device during the assessment of the condition of the pipeline, the system comprising:

a transmitter disposed near a pipeline feature configured to transmit an electronic signal; and a maneuvering means configured to generate a force sufficient to move a pipeline inspection device from one side to another side along a horizontal plane and to move the device from top to bottom along a vertical plane, or any combinations thereof; and an electronic signal receiver in electronic communication with the maneuvering means and configured to receive the electronic signal transmitted by the transmitter to actuate the maneuvering means to operably maneuver the device around the pipeline feature in the intended path of the device as the device is displaced along a length of the pipeline by movement of the liquid in the pipeline.

According to an embodiment there is provided a method for maneuvering a pipeline inspection device carried by a liquid in a pipeline around a pipeline feature during the assessment of the condition of the pipeline, the method comprising:

identifying a pipeline feature expected to interfere with the intended path of the device during the assessment of the pipeline;

transmitting an electronic signal using an external transmitter disposed upstream and in proximity to the pipeline feature;

receiving the electronic signal using a receiver on the device as the device approaches within proximity to the pipeline feature; and actuating maneuvering means on the device to generate a force sufficient to alter the path of the device in a direction around the pipeline feature based on information related by the received electronic signal.

In one aspect, the transmitted electronic signal comprises at least one frequency selected from a plurality of specific frequencies wherein each one of the plurality of specific frequencies cause actuation of the maneuvering means to maneuver the device in one specific direction.

In one aspect, the transmitted electronic signal comprises more than one specific frequency to cause actuation of the maneuvering means to move the device in a combination of directions.

In one aspect, wherein the more than one specific frequency comprises a first, second, third, and fourth frequency which cause actuation of the maneuvering means to maneuver the device in the up, down, left, and right direction, respectively.

According to an embodiment there is provided a method for maneuvering a pipeline inspection device carried by a liquid in a pipeline around a pipeline feature, the method comprising:

transmitting an electronic signal using an external wireless transmitter disposed upstream and in proximity to a pipeline feature in the pipeline identified as being expected to frustrate the intended path of a pipeline inspection device;

receiving the electronic signal using a receiver on the device as the device approaches within proximity to the pipeline feature; and actuating maneuvering means on the device to generate a force sufficient to alter the path of the device in a direction around the pipeline feature based on information related by the received electronic signal.

In one aspect, the method further comprising identifying the pipeline feature suspected of frustrating the intended path of the device in the pipeline; and disposing the external wireless transmitter upstream and in proximity to the pipeline feature.

According to an embodiment there is provided a computer readable medium storing instructions that when executed by a processing unit configure the processing unit to carry out a method for maneuvering a pipeline inspection device carried by a liquid in a pipeline around a pipeline feature during the assessment of the condition of the pipeline.

According to an embodiment there is provided a method for maneuvering a pipeline inspection device carried by a liquid in a pipeline around a pipeline feature during the assessment of the condition of the pipeline, the method comprising:

directing one or more of a camera, sonar sensor, or time of flight sensor disposed on a pipeline inspection device forward of the pipeline inspection device to identify a pipeline feature suspected of interfering with an intended path;

obtaining sensory information from the one or more of a camera, sonar sensor, or time of flight sensor;

determining from the obtained sensory information whether the intended path of the device will be affected by the pipeline feature; and causing the actuation of the maneuvering means to generate a force sufficient to maneuver the device in a direction away from the pipeline feature if the intended path of the device is determined to be affected.

In one aspect, the sensory information is obtained using a camera and a time of flight sensor, wherein the time of flight camera resolves a distance between the camera and the pipeline feature.

In one aspect, the determining is by a processing unit arranged to receive the sensory information and apply an algorithm to establish the relative position in space of the device and the position of the pipeline feature to determine whether the intended path of the device is to be affected by the pipeline feature.

In one aspect, the intended path is determined to be affected when pipeline feature is an obstacle in the path of the device.

In one aspect, the obstacle is a valve.

In one aspect, the valve is a butterfly valve (BFV).

A method for maneuvering a pipeline inspection device carried by a liquid in a pipeline around a pipeline feature during the assessment of the condition of the pipeline, the method comprising:

identifying a pipeline feature in an intended path of a pipeline inspection device by directing one or more of a camera, sonar sensor, or time of flight sensor disposed on a pipeline inspection device towards the intended path;

obtaining sensory information from the one or more of a camera, sonar sensor, or time of flight sensor;

determining from the obtained sensory information whether the intended path of the device will be frustrated by the pipeline feature; and actuating of the maneuvering means to generate a force sufficient to maneuver the device in a direction away from the pipeline feature if the intended path of the device is determined to be frustrated by the pipeline.

Directional references within the present specification and claims, such as "vertical" "horizontal" and the like are intended purely for ease of description and refer to the normal orientation of the pipeline inspection device carried by the fluid within the pipeline. The three axes are defined as the vertical axis (x) which extends up and down, a transverse axis (y) which extends laterally from left to right, and a longitudinal axis (z) which extends along the length of the pipeline. The term "forward" refers to a downstream direction in the direction of flow of fluid in the pipeline and "rearward" refers to an upstream direction opposite to the flow of fluid in the pipeline. The term "radial" means motion away from/towards the longitudinal axis towards/away from the wall of the pipeline.

DETAILED DESCRIPTION

Figure 1:
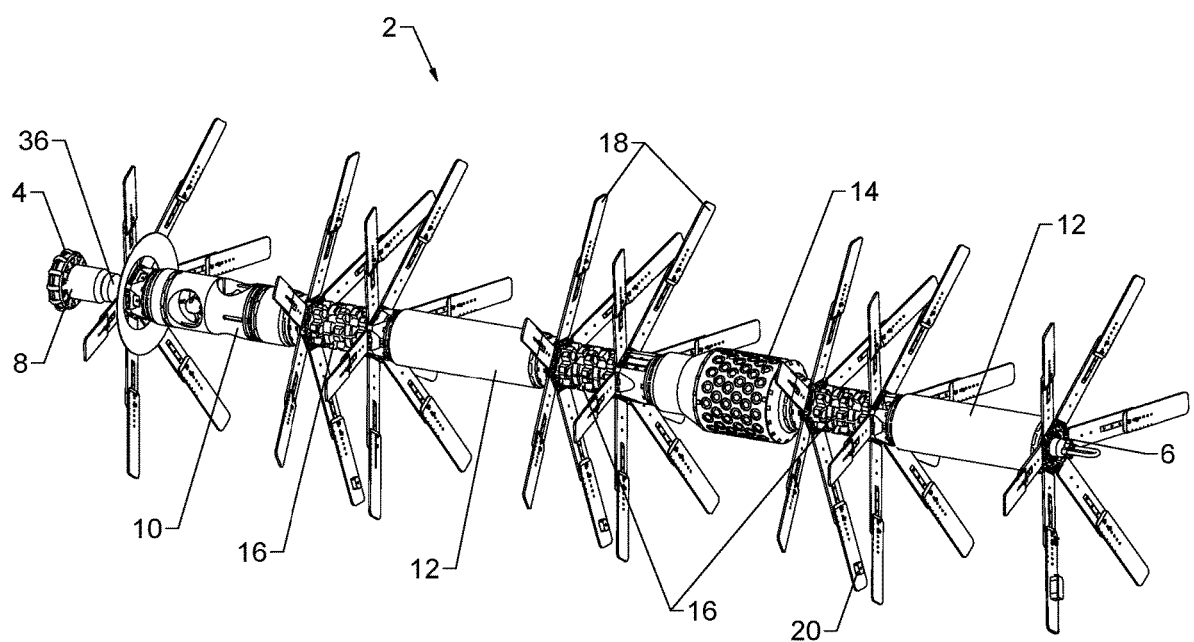
FIG. 1 is a perspective view of a pipeline inspection device including a radial propulsion module, in accordance with an embodiment of the invention.

Reference will be made below in detail to exemplary embodiments of the invention, examples of which are illustrated in the accompanying drawings. Wherever possible, the same reference numerals used throughout the drawings refer to the same or like parts.

Figure 2:
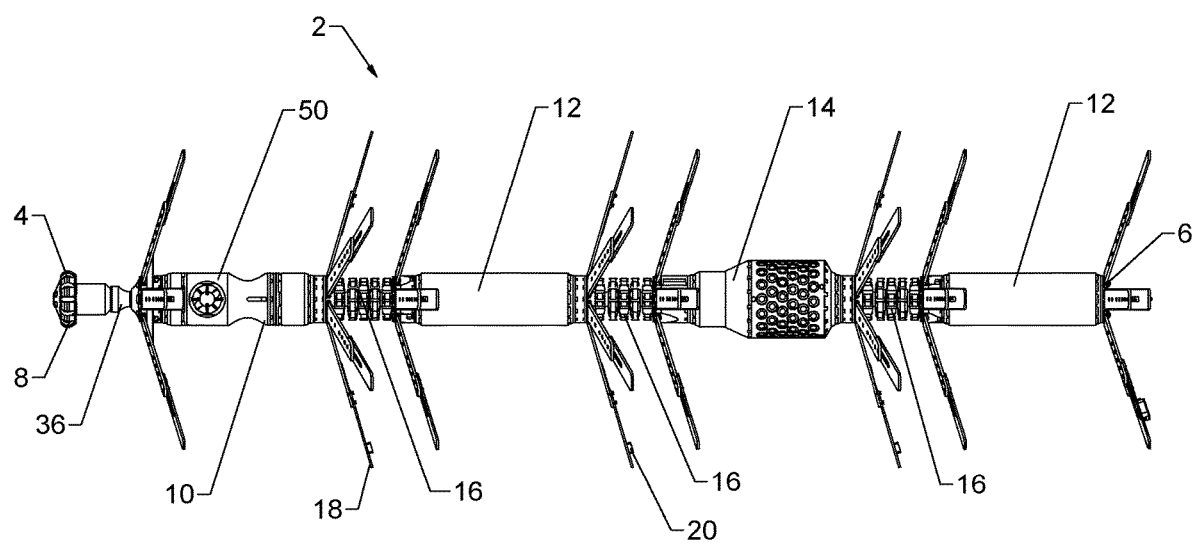
FIG. 2 is a side elevation view of the pipeline inspection device of FIG. 1.

FIGS. 1 and 2 show a deployable pipeline inspection device 2 configured to be deployed into a liquid-containing pipeline (not shown) to inspect the condition of the walls of the pipeline. The pipeline may be partially or completely filled with liquid (e.g. oil or water) and the liquid can be flowing from an upstream end towards a downstream end of the pipeline. The device 2 generally comprises a forward section 4 and a rear section 6 opposite of the forward section 4. As discussed above, the terms "forward" and "rear" are used solely for convenience and to establish some directional reference in relation to the direction of movement of the device 2 in the pipeline.

Between the forward section 4 and the rear section 6 of device 2 is disposed a nose 8, a radial propulsion module 10, one or more battery modules 12, a computer and sensor module 14 for collecting information about the condition of the pipeline, tow links 16 disposed between modules to permit flexing between the modules, a plurality of supporting spring-loaded collapsible petals 18 with customizable length that are disposed along the length of the device 2 for centering the device 2 with the pipeline, and keel weights 20 disposed on the supporting petals 18 to fix the orientation of the device 2 and/or reduce or eliminate wobble.

Figure 3:
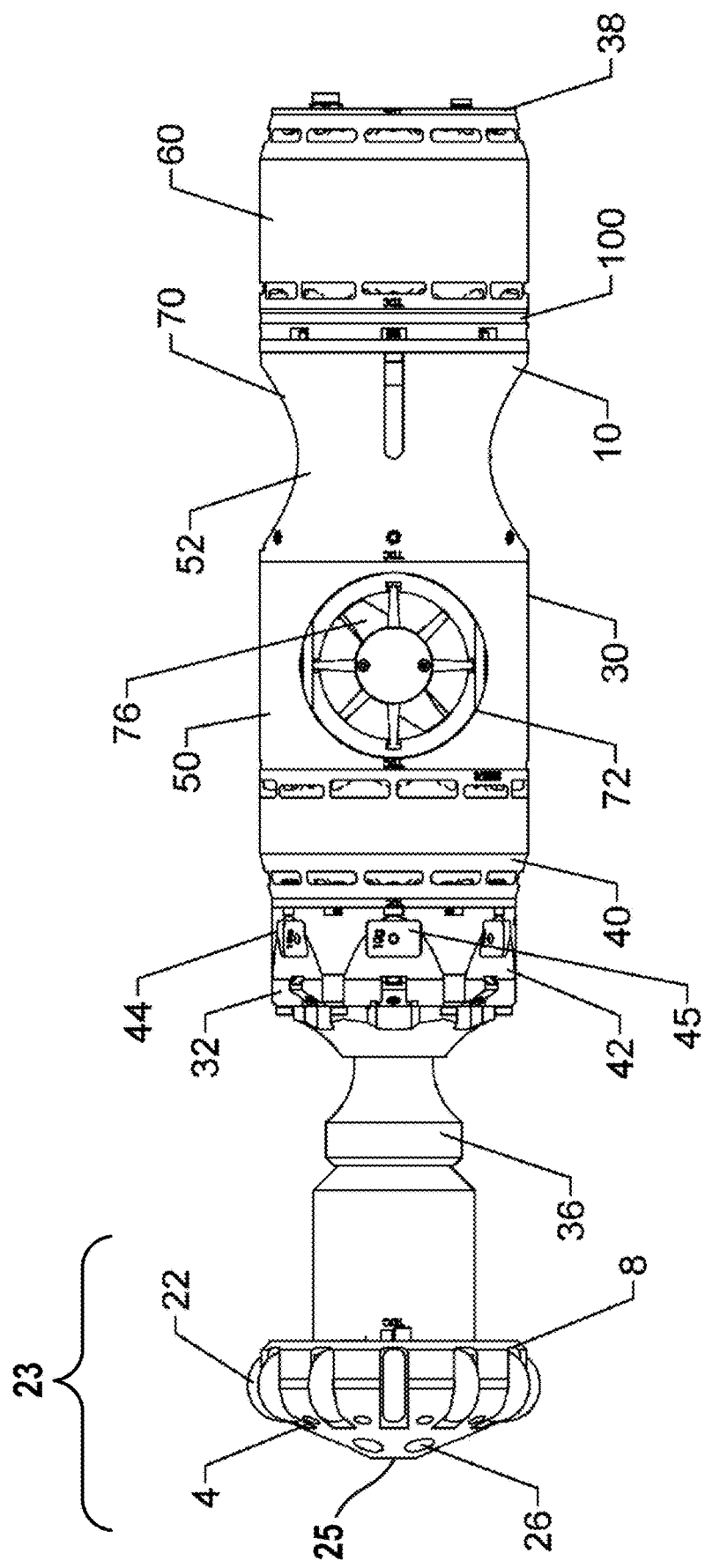
FIG. 3 is a side elevation view of a radial propulsion module secured to a sensor of a pipeline inspection device, in accordance with an embodiment of the invention.
Figure 4:
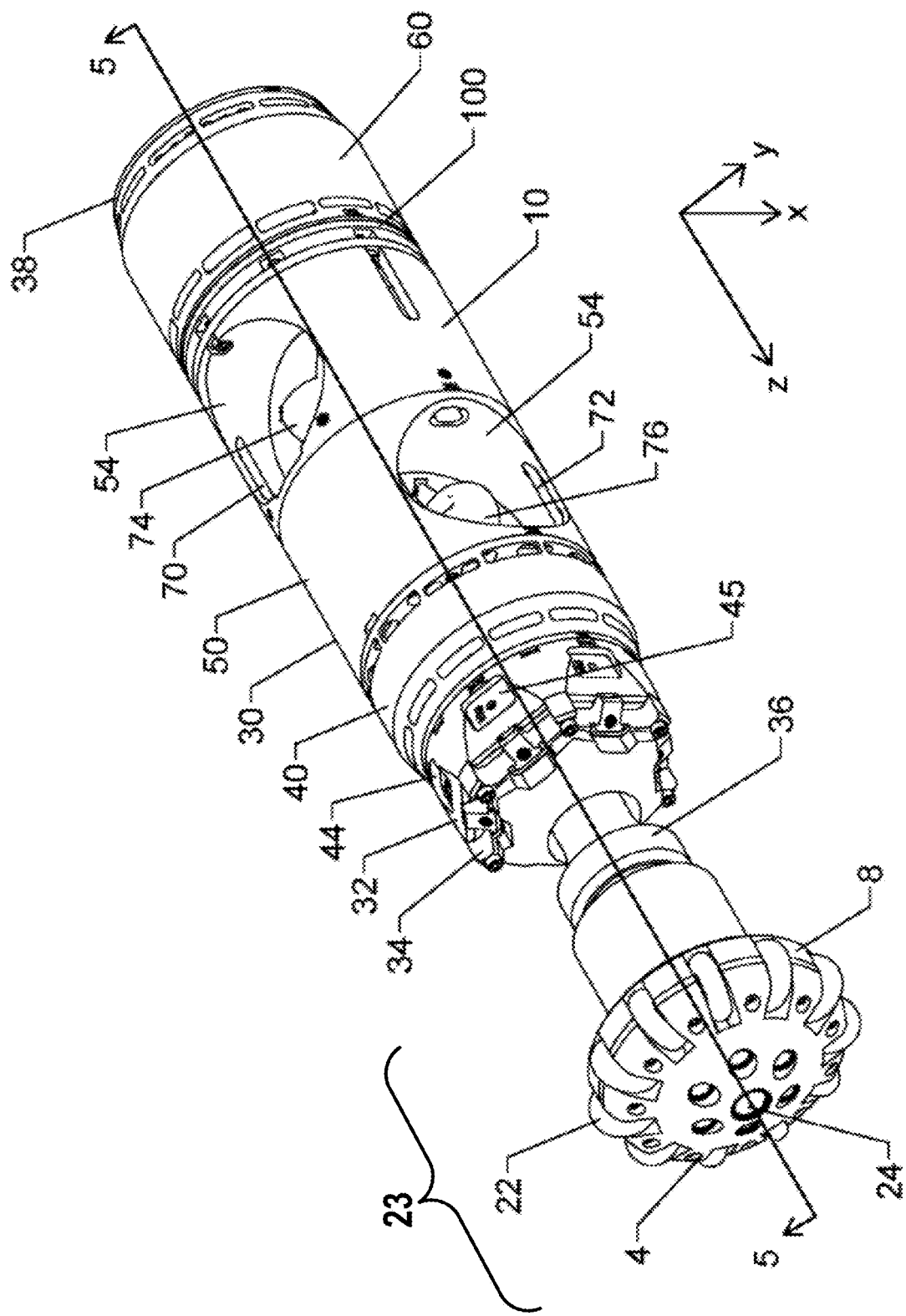
FIG. 4 is a perspective view of the radial propulsion module secured to the sensor of a pipeline inspection device as shown in FIG. 3.
Figure 5:
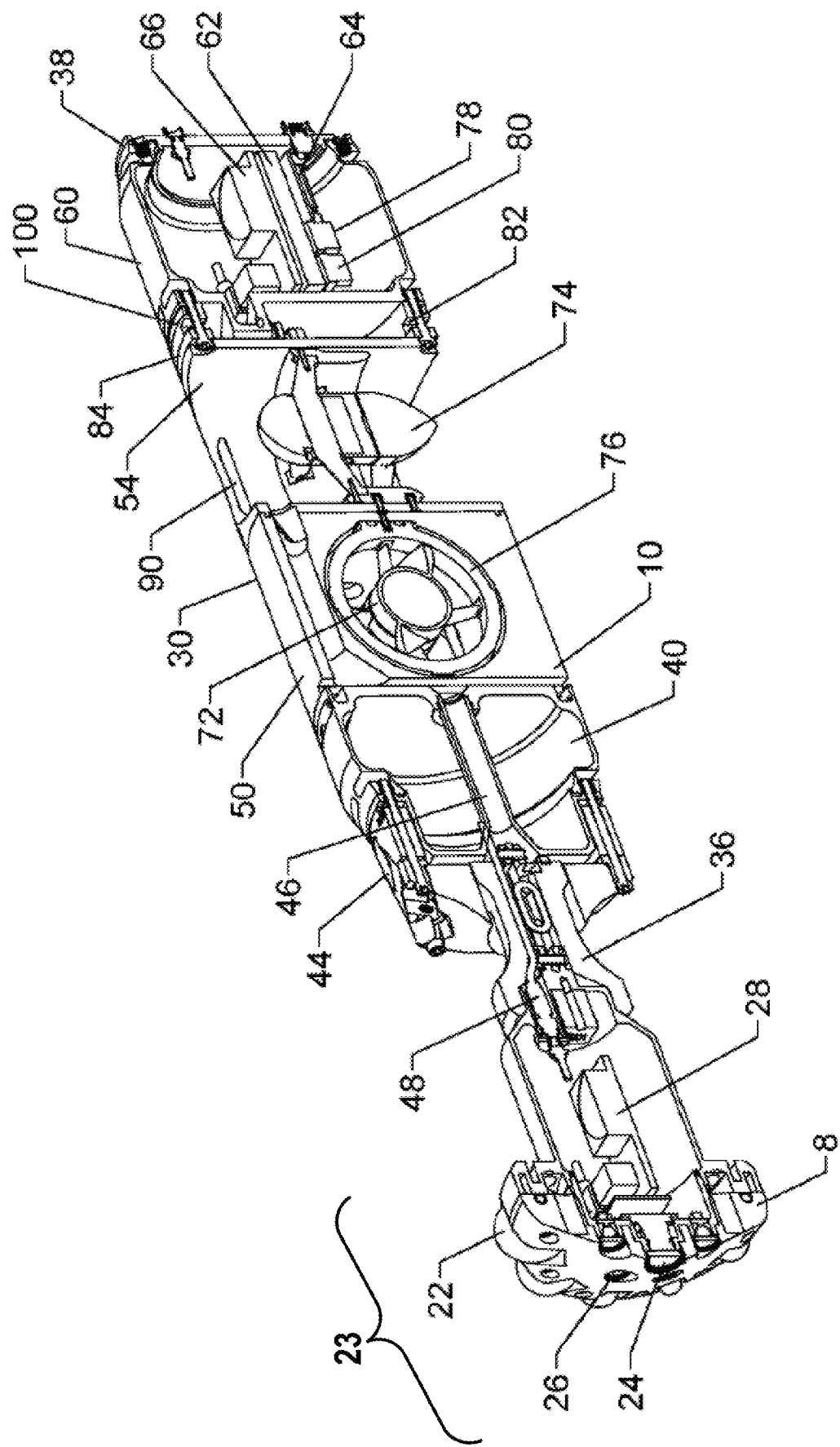
FIG. 5 is a cross section along the line 5-5 in FIG. 4.

FIGS. 3 to 5 show the nose 8 and the radial propulsion module 10 of an embodiment of the device 2 in greater detail. Nose 8 includes a plurality circumferentially disposed free-spinning wheels 22 to allow the nose 8 to contact, roll, and then passive guide the front around pipeline feature (not shown) such as valves (e.g. butterfly valve (BFV)), bends, wyes and tees and one or more equipment 23 useful for detection of any upcoming pipeline features and and/or collecting information about the condition of the pipeline when the pipeline is filled or partially-filled with a liquid (e.g. oil or water) and the device is carried from an upstream end to a downstream end of the pipeline (not shown). As shown in FIGS. 3 to 5, equipment 23 useful for detection of incoming pipeline features such as valves and crossbars comprises navigation sensors 24 including a camera 25 and various LEDs 26 and navigation electronics 28. As shown, device 2 is provided with camera 25 for optically assessing the condition of the pipeline, however, navigation sensors 24 can be adapted to collect sensor information including any one or all of optical, acoustic, time of flight, and magnetic information useful for detection of incoming pipe features such as valves and crossbars and/or assessing the condition of the pipeline. While the equipment 23 can be secured to the forward portion 4, equipment 23 can also be secured around the rear portion 6 or additionally any at any point therebetween of the device 2.

Radial propulsion module 10, or a plurality of radial propulsion modules 10, provide a means to maneuver the device 2 carried by the liquid around a pipeline feature which would otherwise frustrate by blocking the intended path of the device 2 as it moves within the pipeline. Radial propulsion module 10 comprises an elongate body 30 including a ballast 40 for providing buoyancy, a radial propulsion system 50 configured to provide thrust for moving the device 2 from one side to another side of the pipeline along a horizontal or a transverse plane (represented by y-coordinates along y-z plane) and/or for moving the device from top to bottom of the pipeline along a vertical plane (represented by x-coordinates along the x-z plane), and a control unit 60. As shown, radial propulsion module 10 is secured to the front portion of device 2. Additional radial propulsion modules 10 can be provided, as required. For example, another radial propulsion module 10 can be secured to the rear portion 6 of device 2 (not shown).

Body 30 includes a forward portion 32 comprising a forward petal plate 34 for securing support petals 18 and to secure a flexible nose joint 36 to allow some degree of flex between the nose and the radial propulsion module 10. Body 30 also comprises a rearward portion 38 configured to engage, for example, another module of the device 2 via one tow link 16. One ballast 40, of which there may be a plurality, is located near the forward portion 32 and adjacent to the radial propulsion system 50. Ballast 40 comprises a forward spacer 42 (e.g. a plastic spacer that may be made separately to reduce weight) comprising mounts 44 for balancing weights (45). A cable pass-through 46 allows communication cabling 48 for at least one of power and data to run through the body 30 of the radial propulsion module 10.

As shown, the radial propulsion system 50 is configured to direct the device 2 in a desired direction by generating a horizontal force to move the device 2 from one side to another side along the horizontal plane (represented by y-coordinates), a vertical force to move the device 2 from top to bottom along the vertical plane (represented by x-coordinates), or a combination of horizontal forces and vertical forces. Accordingly, the actuation of radial propulsion system 50 will generally enable the device 2 to move away from the wall of the pipeline and towards the center of the pipeline as defined by a longitudinal z-axis (represented by z-coordinates) of the pipeline (or vice versa).

As shown in FIGS. 3 to 5, propulsion system 50 comprises a propulsion housing 52 that defines one or more chambers 54 configured to receive and secure a vertical thruster 70 for providing vertical thrust to move the radial propulsion module 10 and thus, the device 2 from top to bottom along the vertical plane and to receive and secure a horizontal thruster 72 for providing horizontal thrust to move the radial propulsion module 10 and thus, device 2 from one side to another side along the horizontal plane. Propulsion housing 52 can be made from sufficiently durable material (e.g. HDPE) capable of supporting and protecting the vertical thruster 70 and horizontal thruster 72.

As shown, thrusters 70 and 72 aligned along one common longitudinal axis of the housing 52 and are recessed away from the outer wall of propulsion housing 52 to protect thrusters 70 and 72 from impact and to increase compactness.

Thrusters 70 and 72 can be any type of thruster which can provide a sufficient amount of force for moving the device 2 in the desired direction. In the embodiment shown in FIGS. 1 and 2, the thrusters 70, 72 are propeller-driven thrusters which comprise a respective propeller 74, 76 operably connected to its respective motor drive 78. An exemplary type of propeller-driven thruster is a Blue Robotics T100 ROV thruster (or any other similar type of propeller-driven thruster), however, other types of thrusters and other types of propeller-driven thrusters can be used depending on their size, performance, and weight.

In the embodiment shown in FIGS. 1 to 5, thrusters 70 and 72 are the same type and are aligned along the common longitudinal axis (z). Thrusters 70 and 72 are configured to provide movement in different directions because the thrusters are orthogonally arranged in relation to each other where propeller 74 is configured to rotate about the vertically extending x-axis and where propeller 76 is configured to rotate about the horizontally extending y-axis.

Movement of the device 2 is effected by the actuation of one or more of thrusters 70 and 72, and the overall direction of movement will depend on whether one or both thrusters 70, 72 are actuated (which can be independent or simultaneous actuation) and the direction of rotation (clockwise or counter-clockwise) of each propeller 74, 76. When both thrusters 70, 72 are simultaneously actuated, the resulting movement will be in a direction having a component of the direction of a vertically extending x-axis and a component of the direction of a horizontally extending y-axis. The magnitude of generated thrust can be controlled, for example, by varying the speed of the propeller 74.

Radial propulsion system 50 can be any means for moving the device 2 (e.g. the front 4 and/or the rear 6 portion) in a desired direction in the fluid-filled pipeline by generating a horizontal force, vertical force, or a combination of horizontal force and vertical forces that push against the fluid contained in the pipeline and/or the wall of the pipeline to move the device 2 radially away from the longitudinal center (z-axis) of the pipeline towards the wall of the pipeline and vice versa.

While the radial propulsion system 50 shown FIGS. 1 to 5 comprise two thrusters 72 and 74, the radial propulsion system 50 is not so limited and can comprise fewer than two thrusters or more than two thrusters, depending on the application. In one embodiment, radial propulsion system 50 can comprise one pivotable thruster to provide rotation about any axis between the vertically extending x-axis and the horizontally extending y-axis. For example, depending on the application, more than one of each thruster can be provided to increase the level of generated thrust.

Control unit 60 comprises control electronics 62 including a control printed circuit board (PCB) 64, video processing electronics 66, a motor drive 78 and trigger electronics 80 for actuating the motor drive 78 and/or other electronics (not shown). Control unit 60 includes one or more openings (not shown) for receiving one or more cables (not shown) used to carry at least one of power and data signals between the equipment 23 and the video electronics 66 and one or more cables used to at least one of power or data signals from the propulsion system 50 to the control electronics 62 and control PCB 64. Control unit 60 may also be configured to function as a ballast and to provide additional buoyancy.

Radial propulsion module 10 can comprise a unitary elongate body or can comprise an assembly of individual components. For example, each of ballast 40, radial propulsion system 50, and control unit 60 can be individual components which can be secured together to form module 10.

One or more spacers 82 can be included between each of the individual modules and/or units to provide sufficient room for the connector bulkheads from the nose and the thruster cables to the rear housing and one or more support rods 90 extending from the about the front portion 32 to about the rear portion 6 can be used to assemble and keep together the device 2 from the buoyant module to a coupler ring 84 and to simplify the assembly and to save weight.

In the embodiment show in FIGS. 1 to 5, the device 2 includes one spacer 82 between the radial propulsion module 10 and the control unit 60 and four support rods 90 situated near the outer periphery of the module 10 and extend from about the forward portion 32 to about the rear portion 34 of the module 10 in order to support and hold the module 10 together.

In one embodiment of the device 2 moving from the front 4 to the rear 6 portion of the device 2, the device 2 comprises the equipment 23, the ballast 40, the radial propulsion system 50, the spacer 82, and the coupler ring 84, the control unit 60, the support rods 90, and a trigger RX coil 100 (which is discussed in further detail below), and a tethering assembly (not shown) which operably connects the device 2 to surface equipment (not shown). In other embodiments, control unit 60 can be omitted from the module 10 because the control functions can be provided at the surface and connected to the device 2 via the tether (not shown).

In operation, device 2 can be moved in the desired position by actuating one of thrusters 70, 72 or by simultaneously actuating thrusters 70, 72. In one embodiment, the actuation of the thrusters 70, 72 will provide temporary thrust sufficient to overcome any drag forces and/or resistance by support petals 18 and to guide the nose of the tool around pipeline features expected to frustrate the intended path of the device 2.

With reference to FIGS. 6 to 13, the present disclosure relates to systems and methods for maneuvering a pipeline inspection device around a pipeline feature such as an obstacle which will frustrate or impede the intended travel of the device along the pipeline and/or navigate around unfavorable tee junctions which can frustrate the intended travel of the device by directing the device into an unintended path during the pipeline inspection.

Figure 6:
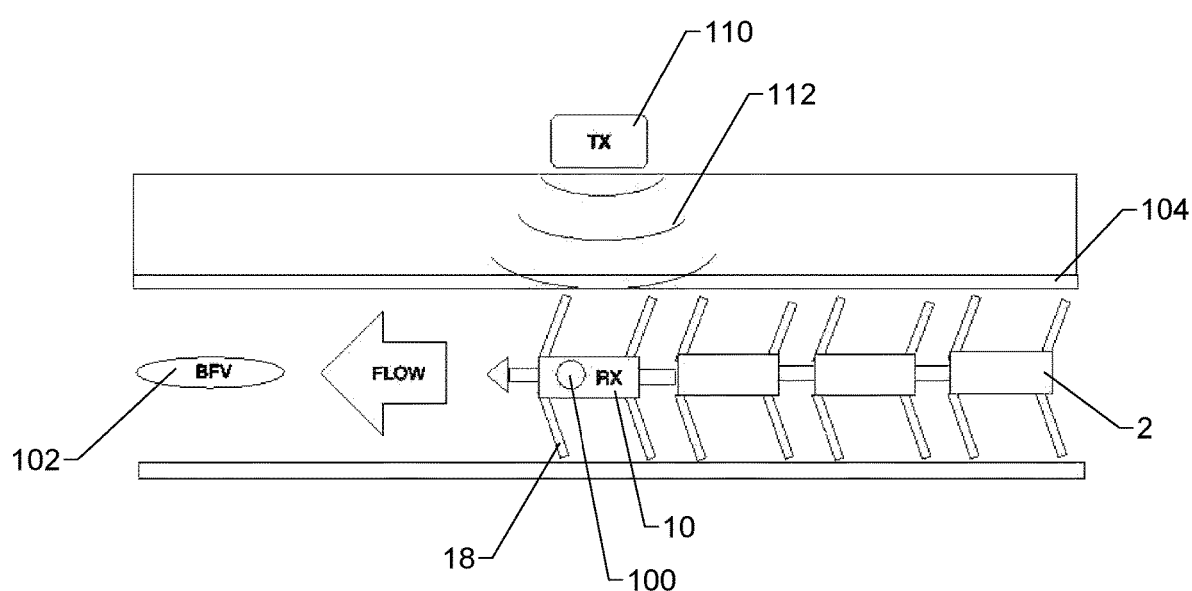
FIG. 6 is a schematic of the pipeline inspection device approaching a BFV.
Figure 7:
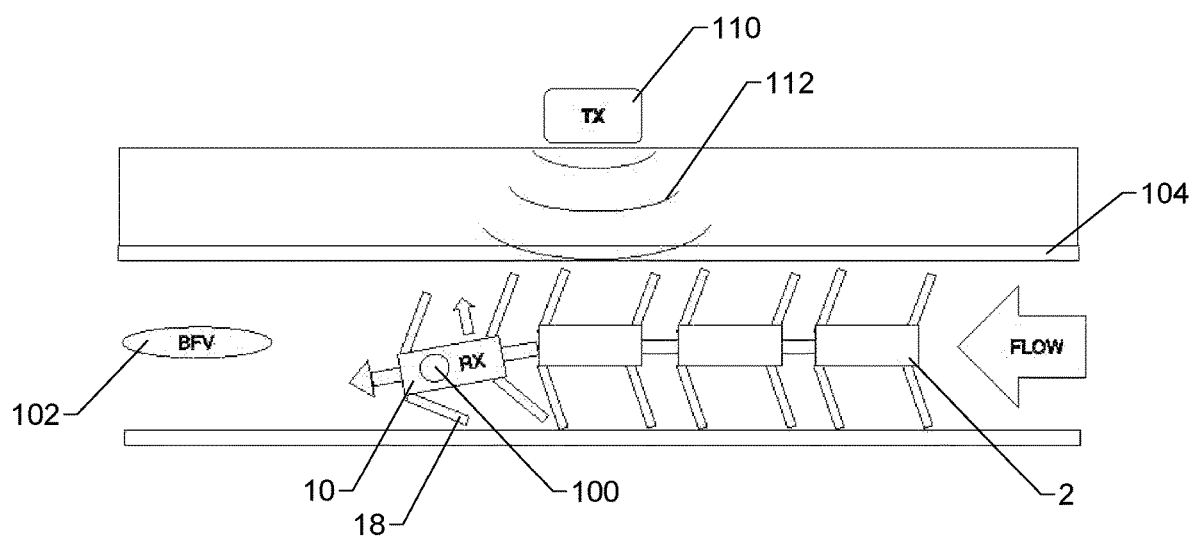
FIG. 7 is a schematic of the pipeline inspection device approaching the BFV upon activation of thrust by the radial propulsion module.
Figure 8:
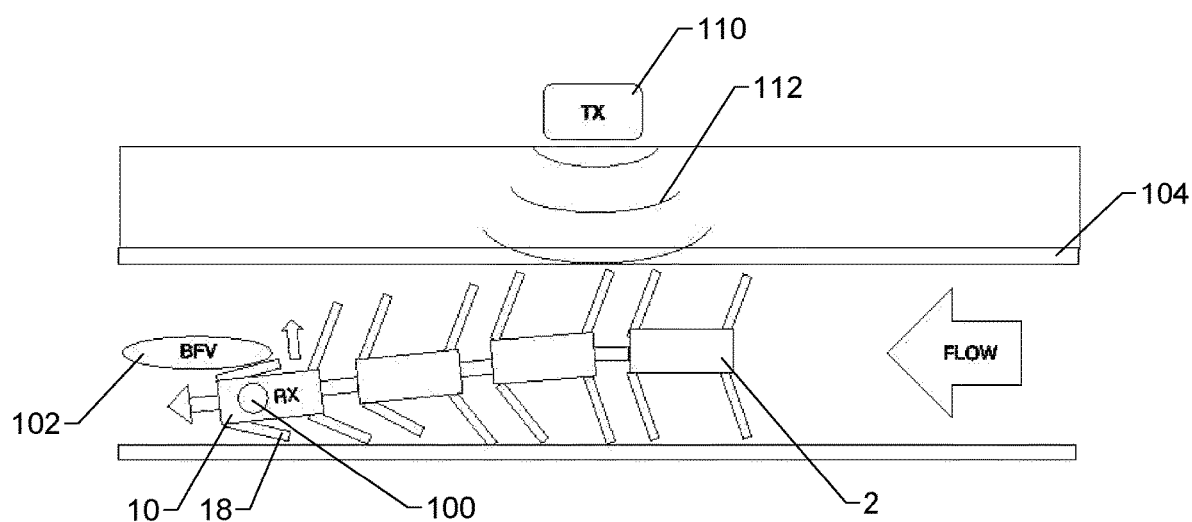
FIG. 8 is a schematic of the pipeline inspection device clearing the BFV.

FIGS. 6 to 8 show a semi-autonomous system and method for controlling the operation of the radial propulsion module 10 when encountering a known obstacle 102 such as a valve passage of a pipeline 104 during the pipeline inspection. In this embodiment, an external trigger transmitter 110 (TX unit) disposed near the known obstacle is configured to broadcast an electronic signal 112 comprising one or more frequencies to be received by the trigger RX coil 100 on the device 2. Onboard trigger electronics 80 receive the signal 112 and process the information and then operably cause the activation of the motor drive 78 to cause a suitable amount of thrust to overcome the resistance of the support petals 18 and/or the direction of thrust (left, right, up, down, or any combination thereof) at one or more pre-planned locations necessary to avoid the known obstacle 102 expected to be in the intended path of the device 2.

In particular, as shown in FIG. 6, when the device 2 comprising the trigger RX coil 100 approaches within a certain proximity of the external trigger TX unit 110 disposed near a known horizontal butterfly valve (BFV) 102, the RX coil 100 is configured to receive the electronic signal 112 comprising one or more frequencies generated by the external trigger TX unit 110. The received signal is then processed by the onboard trigger electronics 80 which then sends a specific command to the radial propulsion module 10 to actuate one or more thrusters 70,72. In this case, the specific command caused the actuation of the vertical thruster 70 to point the nose down to avoid the horizontal BFV. As shown in FIGS. 7 to 8, vertical thruster 70 activation is maintained until the device 2 passes the horizontal BFV 102 and there is no contact with the nose 8.

According to another embodiment, there is provided an autonomous system and method for controlling the operation of the radial propulsion module 10 when there is a need to navigate around unknown BFVs or crossbars. The autonomous system and method comprises the navigation equipment 23 for collecting sensory information about approaching pipeline features such as valves and crossbars and this information is processed using algorithms to determine the valve and plate orientation.

The navigation equipment 23 for pipeline feature detection could be implemented using various methods. The first method is visual data collection using HD camera 24 with white LEDs 26 for pipe illumination. The second method is use of a time-of-flight depth camera. The third method is use of a sonar imaging sensor. Regardless of the method for collecting the sensor stream data, the sensor stream data is fed to the navigation electronics 80 for processing (e.g. an Nvidia Jetson Nano board) and for sending a command to the motor drive 78 to temporarily activate either the vertical thruster 70 of the radial propulsion module 10 to move the nose up or down (along the x-z plane), or to the horizontal thruster (not shown) to move the nose left or right (along the y-z plane), or a combination of the two to move diagonally (along two planes).

In some aspects, machine learning and/or data analytics is applied to the sensor data stream to identify a valve or cross bar, its shape and orientation, the largest opening for passage, and provide a command through the communication cable 48 to the motor drive 78 and trigger electronics 80 to temporarily activate one or two thrusters 70,72 to direct the nose left, right, up, down or diagonal to pass the obstacle.

According to another embodiment, there is provided an autonomous and a semi-autonomous system and a method for controlling the operation of the radial propulsion module 10 for navigating around both unknown and known pipeline features. For passing an unknown BFV or crossbar, the autonomous system operates using the navigation sensors 23 to detect the valve or crossbar and the valve plate or crossbar orientation and then send a signal to the motor drive 78 to actuate the one or more thrusters 70, 72 to avoid the obstacle. For passing a known vertical valve, as described above, the nose 8 can be triggered to point left or right and for passing a known horizontal valve, the nose 8 can be triggered to point the nose up or down to aim the nose 8 towards the opening. In areas where the valve location is known, the autonomous function is overridden manually to improve the redundancy of the system.

In some embodiments, multiple external trigger TX units 110 could be placed at distanced intervals to cast a signal net over a broad area to ensure the signal 112 is received by the device 2 as it travels along the pipeline. The thruster(s) would only be activated for a certain amount of time once the signal is received, after which, the thruster(s) would be deactivated. If the signal 112 is still received by the device 2, the thruster would trigger again for another duration. If not, the device 2 will have likely passed the pipeline feature 102 and the thruster is then deactivated and the supporting petals 18 would push the device back to the longitudinal center of the pipeline to resume scanning for pipeline defects.

FIGS. 9 to 12 show a system and a method for controlling the operation of the radial propulsion module 10 when maneuvering around an unfavorable tee junction during the pipeline inspection.

When the direction of flow and the location of the unfavorable tee junction is known from the plan layout of the pipeline, one external TX trigger 110 unit is disposed a certain distance upstream of the unfavorable tee junction and as close to the pipeline as possible, ideally directly above the pipeline.

Figure 9:
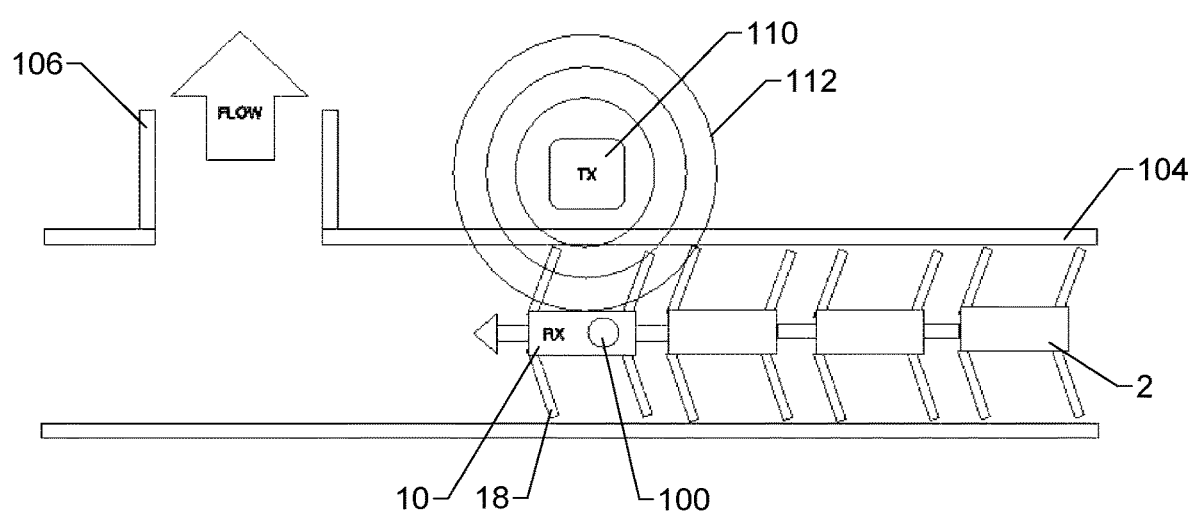
FIG. 9 is a schematic of the pipeline inspection device approaching an unfavorable tee.
Figure 10:
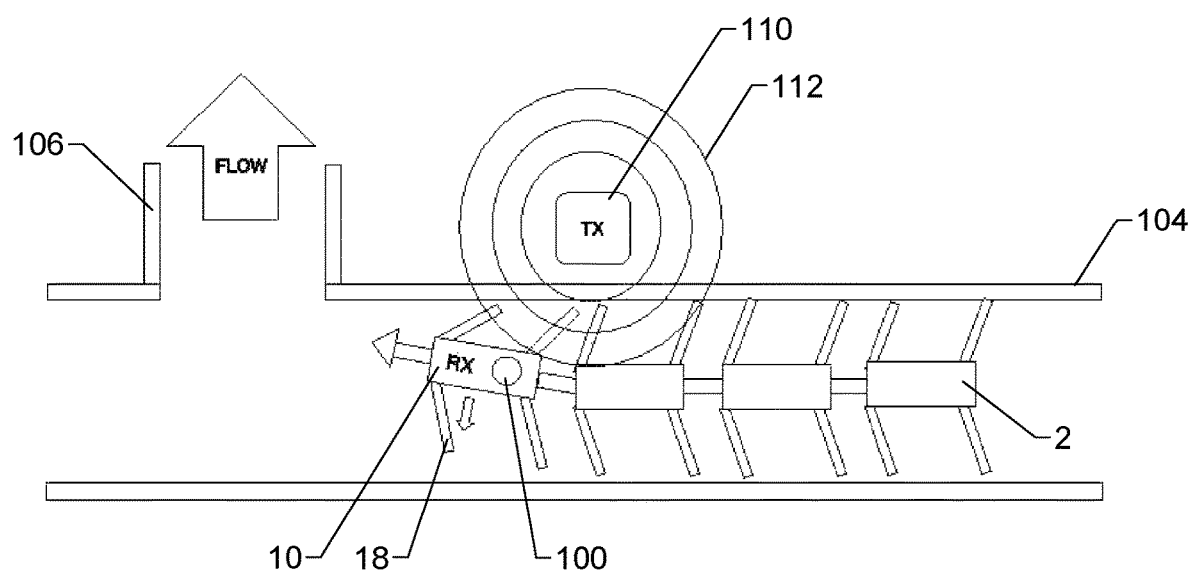
FIG. 10 is a schematic of the pipeline inspection device approaching the unfavorable tee upon activation of thrust by the radial propulsion module.
Figure 11:
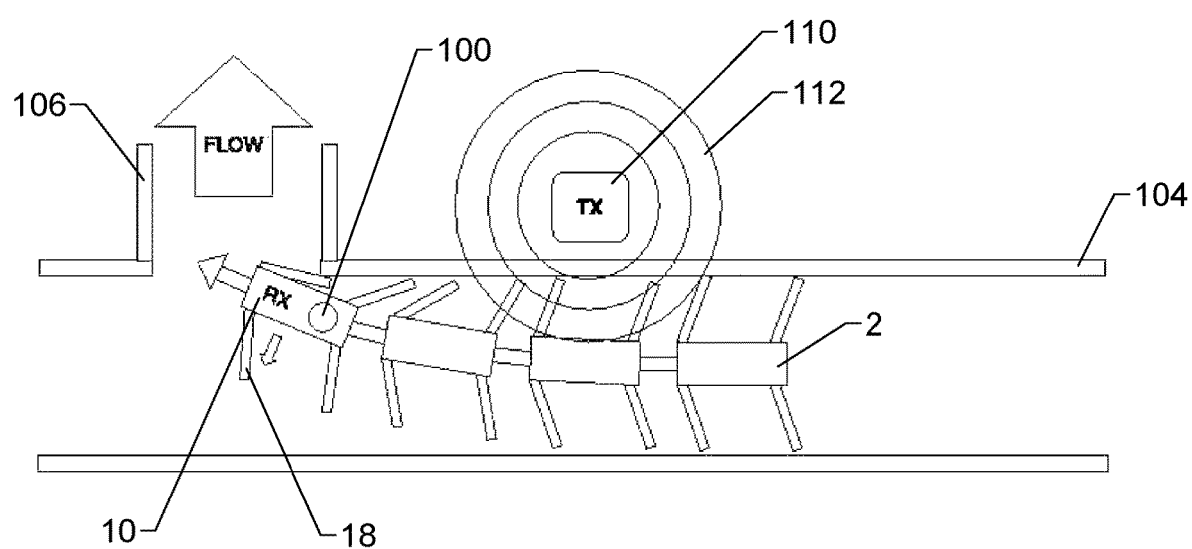
FIG. 11 a schematic of the pipeline inspection device positioned to clear the unfavorable tee.
Figure 12:
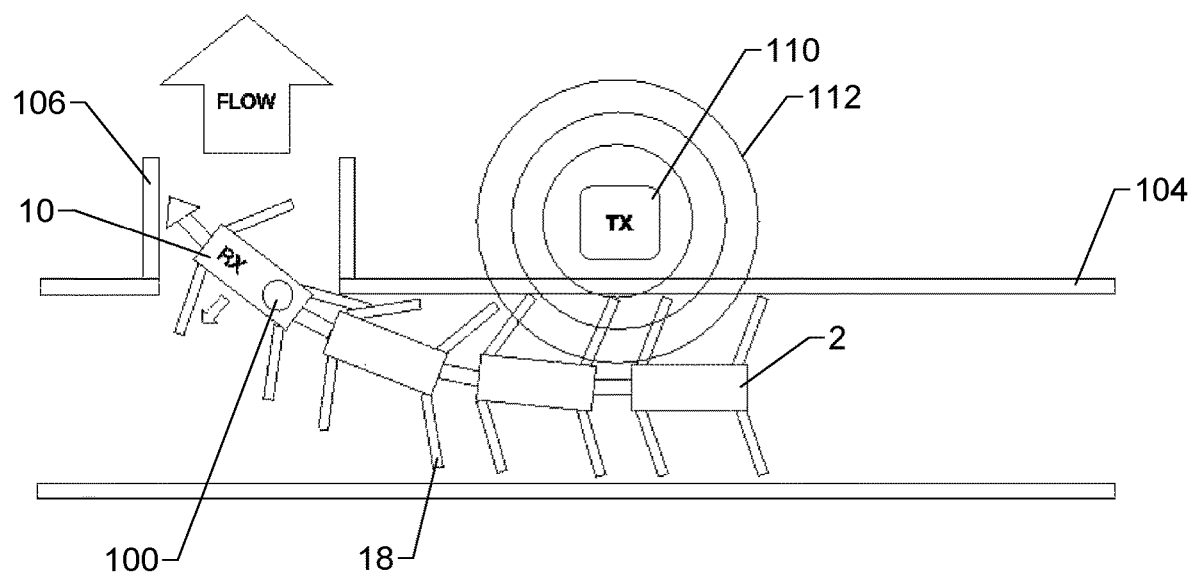
FIG. 12 is a schematic of the pipeline inspection device clearing the unfavorable tee.

As shown in FIG. 9, when the device 2 arrives in proximity to the TX trigger unit 110 disposed near the unfavorable tee junction, the device receives an electronic signal 112 from the external TX trigger unit 110, the signal 112 is processed by onboard trigger electronics 80 and a command is sent and received by the radial propulsion module 10 to either allow the device 2 to continue through the tee junction or to move the device 2 to the right at the tee junction into a lateral 106 of the pipeline 104. In the second case, the thruster(s) are activated for a limited duration to tilt the nose 8 towards the lateral 106. When the nose 8 of the device 2 has reached the lateral 106, the module 10 would be aligned at an optimal position to allow the device 2 to catch the highest flow velocity to further to steer the nose 8 into the lateral 106 as shown in FIGS. 10 and 11. As the device 2 continues forward, the nose 8 would contact the far side of the lateral 106 and would begin to roll and guide the remaining portion of device 2 through the unfavorable tee junction as shown in FIG. 12.

In some embodiments, the TX trigger unit 110 could be configured to turn on only when the device 2 passes an upstream tracking receiver (not shown) that can be disposed at one or more positions along to pipeline and sync to a GPS time and configured to receive a ping from the device 2 to enable the calculation of the distance between the tracking receiver and the device 2. In some other embodiments, if the tee location is not accurate, the multiple external trigger transmitter units 110 could be disposed at spaced intervals to cast a wider signal net over a broad area to ensure the signal 112 is received by the device 2. As well, this approach could also be applied to unfavorable reducing tees where the lateral is smaller in diameter (than the main pipeline) and provided the device 2 has enough clearance to turn into the lateral. In some embodiments, velocity of fluid flow is another factor to determine how soon before the tee and the amount of force that needs to be generated to turn into the lateral 106.

Figure 13:
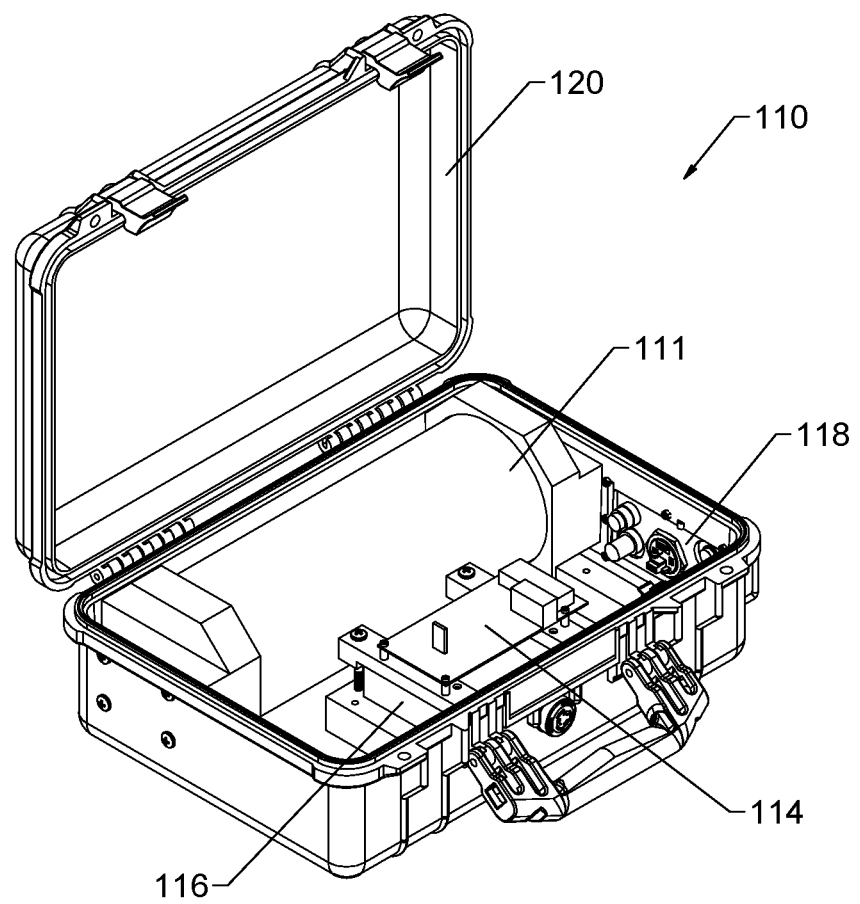
FIG. 13 is a perspective view of a transmitter coil for communicating to the radial propulsion module, in accordance with an embodiment of the invention.

As shown in FIG. 13, the external trigger TX unit 110 can be a standalone self-contained unit comprising a TX coil 111, drive electronics 114, a rechargeable lithium ion battery 116, and a command selector 118 housed in a rugged water-resistant case 120. An external interface of the TX unit 110 comprises an on/off switch, a charging port, and the mode selector 118 for selecting commanding movement of up, down, left or right for maneuvering around any obstacle. Depending on the selection, a different electromagnetic (e.g. low-frequency needs to penetrate concrete encased pipeline) signal, either f1, f2, f3 or f4 would be transmitted which would command the tool to tilt the nose of the device 2 up, down, left or right, respectively.

The TX unit 110 could be placed as close as possible to the pipeline 104. In preferred embodiment, the TX unit 110 is disposed directly above the pipeline 104 and a distance upstream of the valve or cross bar or unfavorable tee. In aspects, the upstream distance would depend on the depth and range of the TX signal 112 generated and the response time for the RX coil 100 on the device 2 to receive the signal 112, activate the thruster(s) and position the nose in the desired correct position.

The embodiments of the present application described above are intended to be examples only. Those of skill in the art may effect alterations, modifications and variations to the particular embodiments without departing from the intended scope of the present application. In particular, features from one or more of the above-described embodiments may be selected to create alternate embodiments comprised of a subcombination of features which may not be explicitly described above. In addition, features from one or more of the above-described embodiments may be selected and combined to create alternate embodiments comprised of a combination of features which may not be explicitly described above. Features suitable for such combinations and subcombinations would be readily apparent to persons skilled in the art upon review of the present application as a whole. Any dimensions provided in the drawings are provided for illustrative purposes only and are not intended to be limiting on the scope of the invention. The subject matter described herein and in the recited claims intends to cover and embrace all suitable changes in technology.

The invention claimed is:

1. A pipeline inspection device for assessing a condition of a pipeline containing a liquid, the pipeline inspection device comprising:
a propulsion module configured to generate a force sufficient to move the pipeline inspection device from one side to another side along a horizontal plane and/or to move the pipeline inspection device from top to bottom along a vertical plane to maneuver the device around a pipeline feature in an intended path of the pipeline inspection device as the pipeline inspection device is displaced along a length of the pipeline by movement of the liquid in the pipeline; and
a plurality of collapsable supporting petals extending radially outward from the pipeline inspection device and around a circumference of the pipeline inspection device.

2. The device of claim 1, wherein the propulsion module comprises a radial propulsion system configured to generate a first thrusting force in a direction of a vertically extending x-axis and/or a second thrusting force in a direction of a horizontally extending y-axis.

3. The device of claim 2, wherein the radial propulsion system comprises a first thruster to generate the first thrusting force and a second thruster to generate the second thrusting force.

4. The device of claim 3, wherein the radial propulsion system further comprises a propulsion housing, and the first and second thrusters are secured within the propulsion housing and wherein the first thruster and the second thruster are aligned along a common longitudinal axis of the propulsion housing.

5. The device of claim 4, wherein the first and second thrusters are propeller-driven thrusters and the propeller of the first thruster is configured to rotate about the vertically extending x-axis and where propeller of the second thruster is configured to rotate about the horizontally extending y-axis.

6. The device of claim 1, further comprising an electronic signal receiver in electronic communication with the propulsion module, the electronic signal receiver configured to receive an electronic signal from an external transmitter to operably cause the actuation of the propulsion module to move the device around the pipeline feature.

7. The device of claim 1, further comprising a sensor configured to obtain sensory information about the pipeline feature, and control electronics in electronic communication with the sensor, the control electronics configured to receive the sensory information, determine, using the sensory information, whether the pipeline feature will frustrate the intended path of the device, and wherein when the pipeline feature is determined to frustrate the intended path of the device, wherein the control electronics operably actuate the propulsion module to maneuver the device around the pipeline feature.

8. The device of claim 1 wherein the pipeline feature is a valve or a tee junction.

9. The device of claim 1, wherein the plurality of collapsible supporting petals extend away from a body of the device to contact a wall of the pipeline and space the body of the device away from the wall of the pipeline.

10. The device of claim 9, wherein the plurality of collapsible supporting petals are moveable between an expanded and collapsed position in related to the body of the device.

11. The device of claim 1, wherein the device is free of wheels with treads to advance the device through the pipeline.

\* \* \* \* \*